US008340572B2

(12) United States Patent
Duffy et al.

(10) Patent No.: US 8,340,572 B2
(45) Date of Patent: *Dec. 25, 2012

(54) SYSTEM AND METHOD FOR SELECTING REPEATERS

(75) Inventors: Darrell Duffy, Sunnyvale, CA (US); Glen Riley, Saratoga, CA (US)

(73) Assignee: Echelon Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/882,108

(22) Filed: Sep. 14, 2010

(65) Prior Publication Data

US 2011/0004801 A1 Jan. 6, 2011

Related U.S. Application Data

(63) Continuation of application No. 11/906,453, filed on Oct. 1, 2007, now Pat. No. 7,796,942, which is a continuation of application No. 10/970,166, filed on Oct. 20, 2004, now Pat. No. 7,277,672, which is a continuation of application No. 09/610,670, filed on Jul. 5, 2000, now Pat. No. 6,862,430.

(51) Int. Cl.
 *H04B 3/36* (2006.01)

(52) U.S. Cl. ........... 455/7; 455/11.1; 455/13.1; 714/749

(58) Field of Classification Search ............. 455/7, 11.1, 455/13.1, 44.1, 41.2, 15, 16, 445, 522, 69, 455/456, 500, 422, 446.6; 370/312, 400, 370/432, 226, 473, 474, 395, 398, 216, 221; 714/749, E11.113; 705/32; 707/10; 709/203
See application file for complete search history.

(56) References Cited

U.S. PATENT DOCUMENTS

| 5,170,393 | A | * | 12/1992 | Peterson et al. | 370/255 |
| 5,805,822 | A | * | 9/1998 | Long et al. | 709/232 |
| 7,103,016 | B1 | * | 9/2006 | Duffy et al. | 370/312 |
| 7,796,942 | B2 | * | 9/2010 | Duffy et al. | 455/7 |
| 2002/0027495 | A1 | * | 3/2002 | Darby et al. | 340/298 |
| 2005/0047327 | A1 | * | 3/2005 | Saleh et al. | 370/221 |
| 2006/0153066 | A1 | * | 7/2006 | Saleh et al. | 370/216 |

* cited by examiner

Primary Examiner — Tan Trinh
(74) Attorney, Agent, or Firm — Blakely, Sokoloff, Taylor & Zafman LLP

(57) ABSTRACT

A method is described for selecting repeaters comprising: transmitting a first signal from a first node to a second node; measuring signal strength of the first signal at the second node; transmitting a second signal from the second node to the first node; measuring signal strength of the second signal at the first node; and selecting the second node as a repeater based on the signal strength of the first signal and/or the signal strength of the second signal.

Another embodiment of the method comprises: calculating signal strength of a signal transmitted to each of a plurality of nodes (the signal strength being measured at each node of the plurality); and selecting one or more of the nodes to be a repeater if the signal strength is below a maximum threshold value and above a minimum threshold value.

12 Claims, 7 Drawing Sheets

SYSTEM AND METHOD FOR SELECTING REPEATERS

PRIORITY

This application is a continuation of U.S. Ser. No. 11/906,453, filed Oct. 1, 2007 now U.S. Pat. No. 7,796,942 which is a continuation of U.S. Ser. No. 10/970,166, filed Oct. 20, 2004, now Issued U.S. Pat. No. 7,277,672, which is a continuation of U.S. Ser. No. 09/610,670, filed Jul. 5, 2000, now Issued U.S. Pat. No. 6,862,430.

BACKGROUND OF THE INVENTION

1. Field of the Invention

This invention relates generally to network configuration techniques. More particularly, the invention relates to an improved system and method for selecting repeaters in a data network.

2. Description of the Related Art

A "repeater" is a communications device that amplifies or regenerates a data signal in order to extend the transmission distance between two or more nodes. Repeaters are available for both analog and digital signals and are used extensively for long distance transmission.

The determination as to where repeaters should be configured/positioned within a network is typically based on the network topology. For example, the physical distance between nodes on the network may be used to determine whether a repeater is necessary. Factored into this calculation is the extent to which data signals will degrade through the physical medium interconnecting nodes on the network. Different types of physical media (e.g., twisted pair, coaxial cable, wireless, . . . etc) have different signal-loss characteristics.

In some circumstances, however, network topology may be unknown at the time the network nodes are interconnected. For example, in circumstances where existing power lines are used to support a communications network, distances between network nodes may not be easily determined. As such, repeater positioning must be accomplished manually, through trial-and-error, by measuring signal strength at various points within the network and configuring repeaters as required.

Accordingly, what is needed is a more efficient system and method for selecting repeaters within a network. What is also needed is a system and method wherein nodes on a network which perform a particular function may configured as repeaters (i.e., in addition to performing that function).

SUMMARY OF THE INVENTION

A method is described for selecting repeaters comprising: transmitting a first signal from a first node to a second node; measuring signal strength of the first signal at the second node; transmitting a second signal from the second node to the first node; measuring signal strength of the second signal at the first node; and selecting the second node as a repeater based on the signal strength of the first signal and/or the signal strength of the second signal.

Another embodiment of the method comprises: calculating signal strength of a signal transmitted to each of a plurality of nodes (the signal strength being measured at each node of the plurality); and selecting one or more of the nodes to be a repeater if the signal strength is below a maximum threshold value and above a minimum threshold value.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of various embodiments of the invention. It will be apparent, however, to one skilled in the art that the embodiments of the invention may be practiced without some of these specific details. Moreover, in some instances, well-known structures and devices are shown in block diagram form to avoid obscuring the underlying principles of the invention.

EMBODIMENTS OF THE INVENTION

Figure 1:
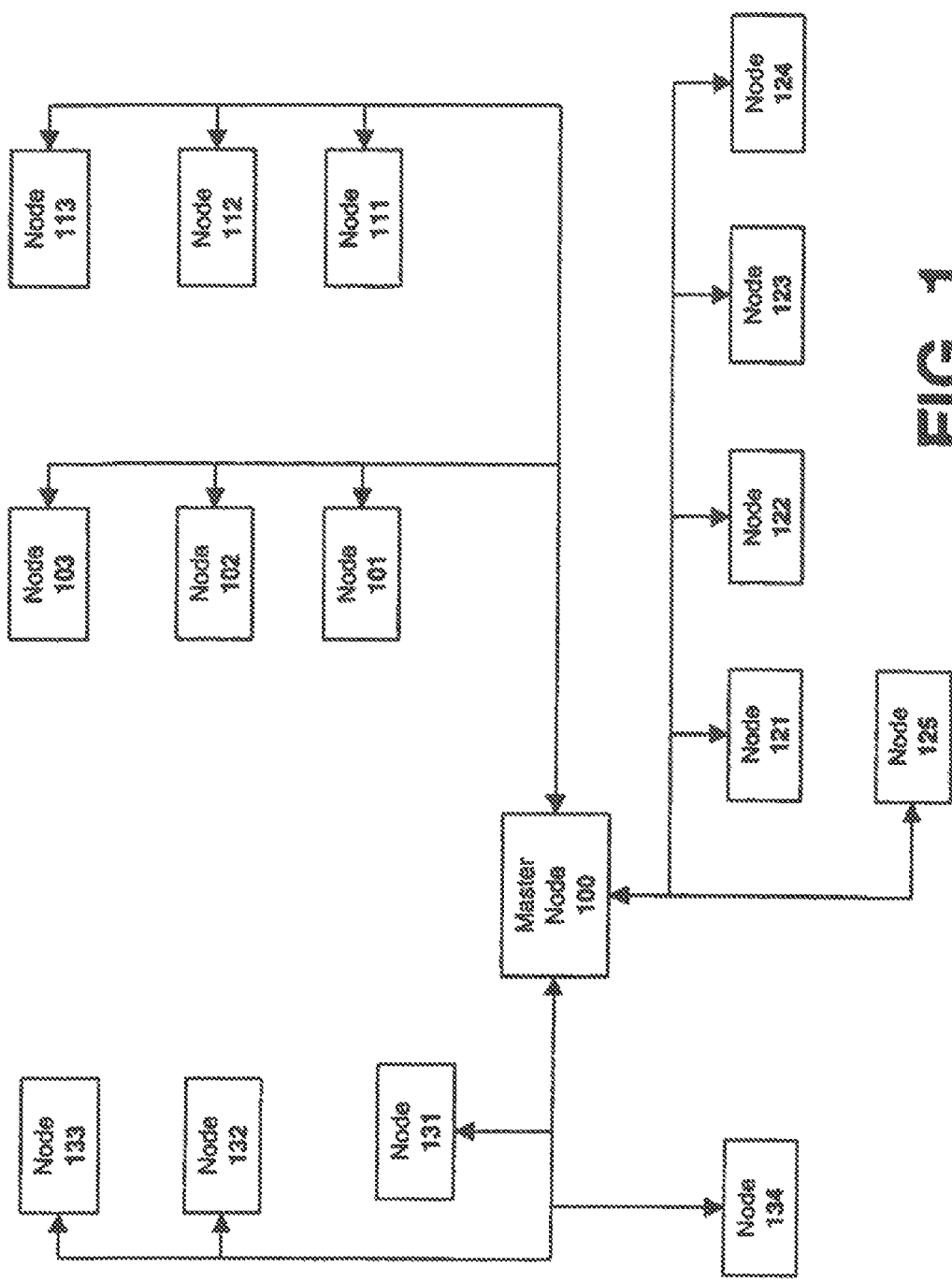
FIG. 1 illustrates a network architecture for implementing various embodiments of the invention.

FIG. 1 generally depicts a network over which a plurality of nodes 100, 101-103, 111-113, 121-125 and 131-134 communicate. In one embodiment, each of the nodes is comprised of a processor (e.g., a microcontroller or a micro-processor) and memory. In addition, each node may be configured to store, process and communicate (internally or with other nodes) code and data using machine-readable media such as magnetic disks, random access memory ("RAM"), read only memory ("ROM"), carrier wave signals, etc. Moreover, while particular embodiments of the invention may be implemented in software, alternative embodiments may implement the functions described herein using any combination of software, firmware and/or hardware.

In one particular embodiment, the nodes 100, 101-103, 111-113, 121-125 and 131-134 form a distributed control network such as the Lonworks® Network developed by Echelon® Corporation. In this embodiment, each of the nodes 100, 101-103, 111-113, 121-125 and 131-134 may be programmed to perform a specific task. For example, individual nodes may be configured as proximity sensors, switches, motion detectors, relays, motor drives, and/or other types of instruments (e.g., utility meters). The individual nodes of this embodiment may be programmed to work together as a whole to perform a complex control application such as running a manufacturing line or automating a building. It should be noted, however, that the underlying principles of the invention are not limited to any particular type of node or any particular network configuration or application.

Certain embodiments of the invention also employ a proxy communication protocol to extend the communication range of a network channel when it is impractical to use conventional routers to do so. These embodiments may be particularly suited for network media where "breaking" a physical channel into multiple channels via routers is not practical or possible (e.g., radio frequency (RF), power lines, . . . etc).

Repeater Selection

In one embodiment, certain nodes may be configured/programmed to function as repeaters in addition to the other functions performed by those nodes (some examples of which are set forth above). As illustrated in FIG. 1, a master node 100 may be configured to automatically select surrounding nodes 101-103, 111-113, 121-125 and 131-134 to perform repeater functions based on the detected signal strength at those nodes. In one embodiment, the master 100 is programmed with device addresses of each of the nodes, which the master 100 uses to query each of the nodes 101-103, 111-113, 121-125 and 131-134 for signal strength data. After analyzing the signal strength data, the master 100 selects repeater candidates.

Figure 2A:
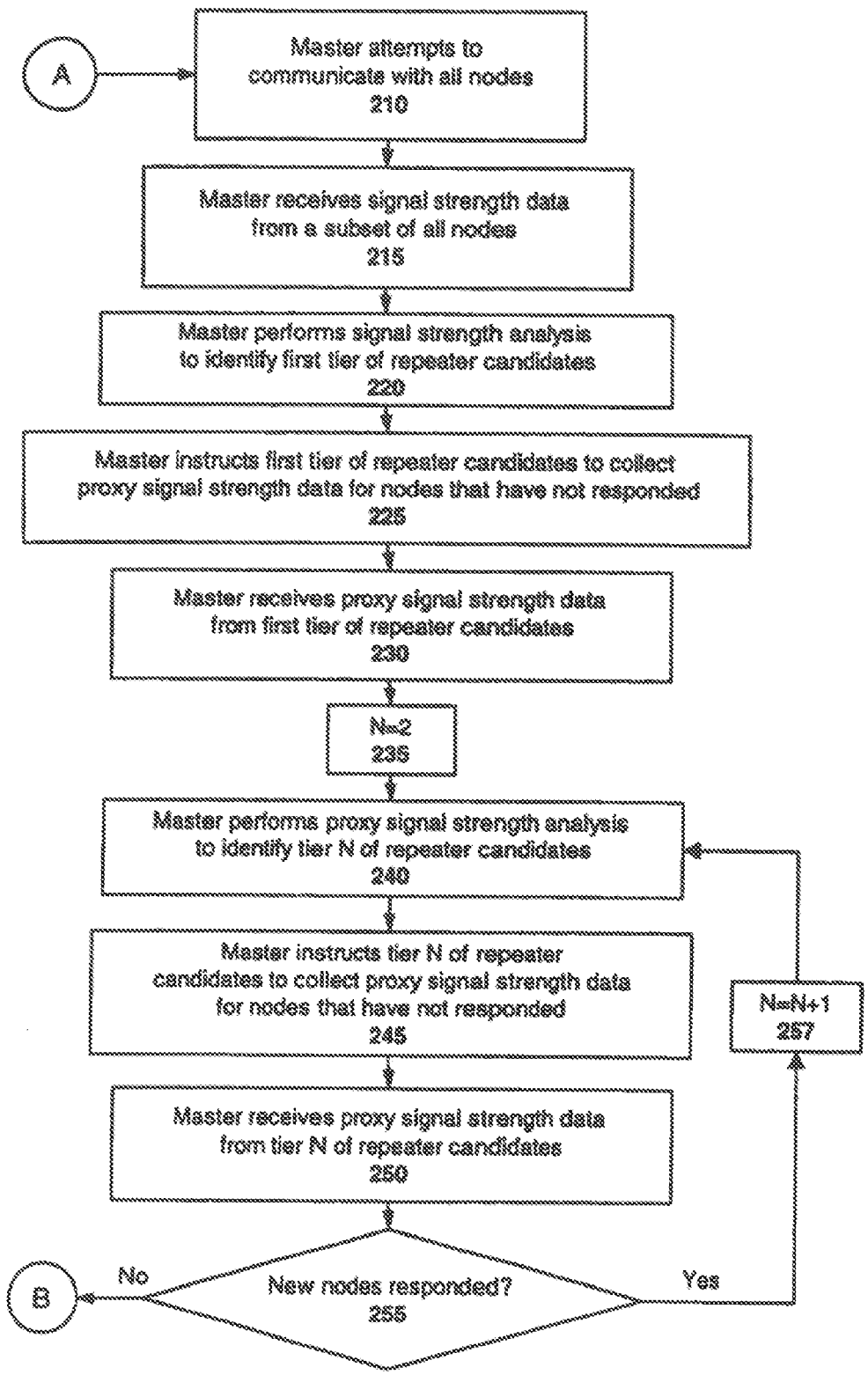
FIGS. 2a and 2b illustrate one embodiment of a method for selecting repeaters on a network.
Figure 2B:
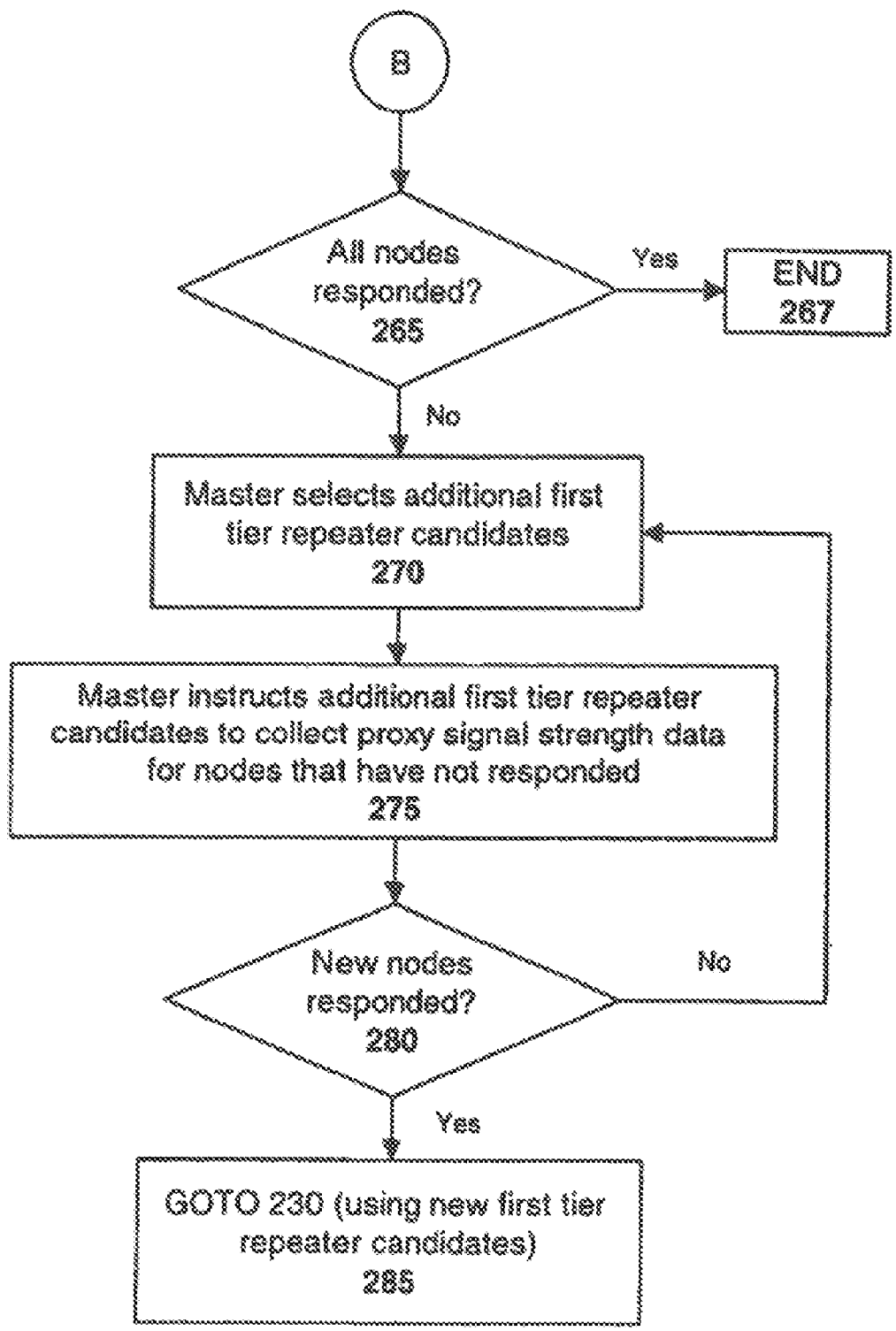

FIGS. 2a and 2b illustrate one embodiment of a method implemented by a master node to identify repeaters. At 210, the master initially attempts to communicate with all network nodes (e.g., by running through a list of node addresses stored in memory).

In the illustrated embodiment, the master node 100 does not merely attempt to communicate but, rather, transmits "return signal strength" query to each of the surrounding nodes. Subsequently (at 215) the master node 100 receives a response from a subset of the nodes (i.e., from those nodes within the transmission range of the master 100). Each response includes an indication of signal quality when the "return signal strength" query was received at each of the nodes. In addition, in one particular embodiment, the master node 100 itself evaluates the signal quality of each node's response as it is received by the master 100. Accordingly, in this embodiment two signal strength values are used by the master node 100 to evaluate the overall signal strength between it and each node on the network: an outgoing signal strength value (measured at the node); and an incoming signal strength value (measured at the master). The master may consider each value separately, may take the average of the two signal strength values or, alternatively, may weigh one value more heavily than the other. Various other techniques for evaluating the two signal strength values may be employed while still complying with the underlying principles of the invention.

Each of the nodes 101-103, 111-113, 121-125 and 131-134 (including the master 100) may measure "signal strength" using a variety of techniques. For example, in one embodiment, the overall carrier strength (e.g., amplitude) of the transmission is measured. Similarly, the signal-to-noise (S/N) ratio associated with the carrier signal may be calculated (i.e., by tracking the noise on the communication channel before and during the reception of the incoming signal). In addition, in one embodiment, the number of bit errors found in incoming data packet(s) may calculated and used to provide an indication of the reliability of the communication channel between the node and the master.

Certain techniques for measuring signal strength may be more appropriate than others depending on network conditions. For example, measuring overall carrier strength may be the most appropriate technique when the noise floor on the channel is below the receiver sensitivity. S/N Ratio may be more useful in cases where the noise on the channel is significant with respect to the signal level, and the number of errors corrected may be useful where other measures of signal strength are not available and/or there is an error correcting code available on the messages.

In one embodiment, the transmitter signal level may be purposely reduced to test the ability of a node to receive a signal. The transmitter signal level can be used as a measure of signal to noise ratio for the purposes of signal analysis. Use of this technique may require sending additional messages to probe for the level of reception.

Any of the foregoing signal strength measurement techniques, alone or in combination, may be employed by the nodes to evaluate "signal strength." Moreover, it should be noted that various other techniques may be employed while still complying with the underlying principles of the invention.

Once the master has collected signal strength values from a subset of all nodes, it performs signal strength analysis (at 220) to determine which nodes in the subset are "first tier" repeater candidates (i.e., those repeaters which will be one transmission length or "hop" away from the master). The master's goal, according to one embodiment, is not to select candidates with the highest measured signal strength but, rather, to select repeater candidates above some minimum (reliable) threshold value, $T_{min}$, and below some maximum threshold value $T_{max}$. In one embodiment, both the outgoing signal strength value (measured at the node) and the incoming signal strength value (measured at the master) must be above the minimum and/or below the maximum threshold value for the particular node to be selected as a repeater.

Figure 3:
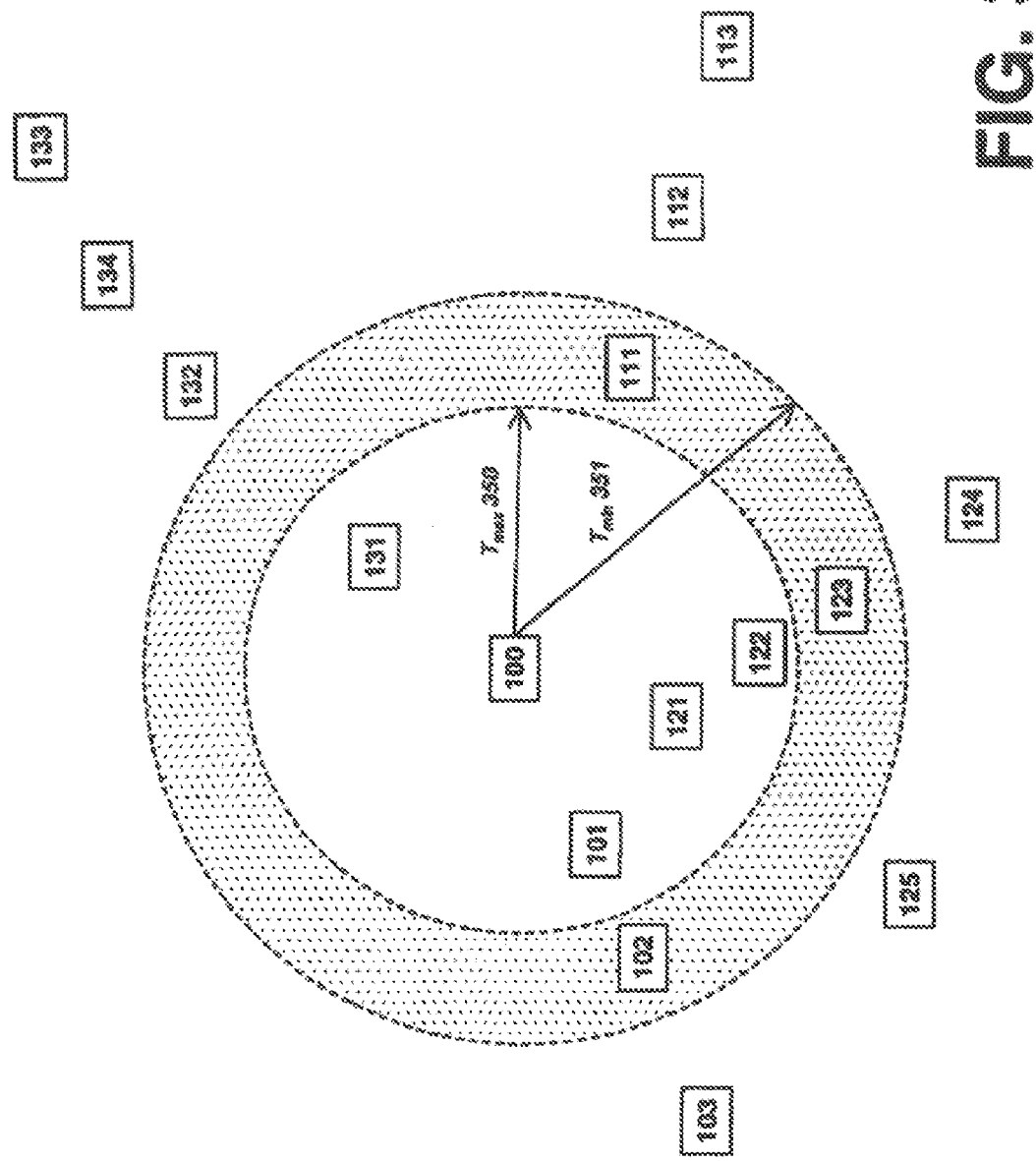
FIG. 3 illustrates signal strength between a plurality of nodes and a master node.

This concept is highlighted in FIG. 3, which illustrates an exemplary signal strength relationship between the master 100 and the various nodes 101-103, 111-113, 121-125 and 131-134 shown in FIG. 1. Nodes which are positioned further away from the master node 100 in FIG. 3 have a relatively lower signal strength value in relation to the master 100.

In the illustrated embodiment, nodes 101, 121, 122, and 131 all have relatively high signal strength values, above some maximum threshold 350 (as indicated). It would be inefficient for the master node 100 to select these nodes as repeater candidates, however, because they are not far enough away from the master node 100 to be useful as repeaters.

By contrast, nodes 103, 112-113, 124-125 and 132-134 are electronically distant from the master node 100 and have signal strength values below some minimum threshold value 351. The master 100 will not initially select these nodes as repeaters because signal strength is so weak that they may prove to be unreliable. In fact, some or all may not even have received the master's 100 initial signal strength query.

Finally, nodes 102, 111, and 123 all have a signal strength value below the maximum threshold value 350 but above the minimum threshold value 351. They are far enough away from the master 100 to make them efficient selections for repeater candidates, while—at the same time—their signal strength is high enough to indicate that they will be reliable as first tier repeaters. Accordingly, in the illustrated embodiment, the master node 100 initially selects nodes 102, 111, and 123 as first tier repeater candidates.

At 225, the master 100 transmits a "proxy return signal strength" command to each of the newly-selected first tier repeater candidates 102, 111, and 123. The "proxy return signal strength" command according to one embodiment is similar to the "return signal strength" command except that it instructs a node (e.g., nodes 102, 111, and 123) to collect signal strength data from other nodes (i.e., those nodes that did not respond when the master 100 initially attempted to communicate with all nodes at 210), and to communicate the results back to the master 100. For the purposes of this example, it will be assumed that none of the nodes below the minimum threshold value 351 have responded (i.e., nodes 103, 112-113, 124-125 and 132-134).

In response to the return signal strength command, node 102 queries node 103 for signal strength data. Subsequently, node 102 receives a response from node 103 which includes an indication of signal quality when the signal strength query was received at node 103. In addition, in one embodiment, node 102 evaluates the signal quality of node 103's response as it is received at node 102. Accordingly, the "proxy return signal strength" command, like the "return signal strength" command, collects an incoming signal strength value (measured at node 102) as well as an outgoing signal strength value (measured at node 103), and transmits the result back to the master 100.

Similarly, in the illustrated example, node 123 collects proxy signal strength data from node 124 and node 111 collects proxy signal strength data from nodes 112 and/or 113.

Once the proxy signal strength data is collected by the first tier repeater candidates, it is transmitted back to the master node 100 at 230. At 235, a method variable 'N,' which represents the particular tier of nodes under analysis is set equal to two. It should be noted, however, that this initialization is only used for the purpose of describing the underlying process set forth in FIGS. 2a and 2b. No such variable initialization is required for complying with the underlying principles of the invention.

At 240, the master analyses the proxy signal strength data to determine which (if any) of the newly-identified nodes should be configured as a second tier repeater. Once again, this decision may be based on where the signal strength values fall within predetermined minimum and maximum signal strength thresholds (as with selection of the first tier of repeaters described above). Thus, node 112 in the illustrated example may be too close to repeater candidate 111 to be properly selected as a repeater (i.e., signal strength may be above the maximum value) but node 113 may be a sufficient distance away to make it an ideal repeater candidate (i.e., within both the minimum and maximum threshold requirements).

Once the master 100 has identified the second tier (or Nth tier) of repeater candidates, at 245 it instructs each of the nodes in the second tier to collect proxy return signal strength data for nodes that have yet to be identified. At 250, the master receives the latest set of proxy return signal strength data and (if any new nodes have responded, determined at 255) analyses the data to identify the next (e.g., the third) tier of repeater candidates. The master proceeds through successive tiers in this manner (i.e., tier N=N+1 with each iteration, as set forth in box 257) until no new nodes are identified using the proxy return signal strength commands. At this point, one embodiment of the system and method proceeds to the flowchart illustrated in FIG. 2b.

At 265, the master determines whether all nodes on the network have responded. If all nodes are accounted for, then the process is complete at 267 (i.e., all nodes are identified and all repeaters have been assigned). If, however, certain nodes have not responded, then the master 100 selects additional first tier repeater candidates in an effort to locate these nodes. Accordingly, the master 100 may select nodes which have signal strength values above the preset maximum 350.

Returning to the particular example illustrated in FIG. 3, the master 100 may select any or all of nodes 101, 121-122, and 131 as new first tier candidates. In one embodiment, the master selects nodes at a signal strength value in the vicinity of one half of the maximum threshold value 350, to increase the likelihood of identifying additional nodes.

At 275, the master 100 instructs the new first tier repeater candidates to collect proxy return signal strength data from any nodes which have not yet responded. Thus, if node 131 is selected, it may attempt to collect signal strength data from nodes 132-134; and if node 121 is selected, it may attempt to collect signal strength data from node 125. The master continues to select new first tier candidates until new nodes have been identified (determined at 280).

Once new nodes respond, the process of searching through successive tiers begins again at 230, where the master receives a new set of proxy return signal strength data from the new first tier repeater candidate(s). The master then works its way through successive tiers as described above until no new nodes are responding (determined at 255). When all nodes have been identified (determined at 265) the process is complete (at 267).

In one embodiment, the master node 100 is not initially programmed with device addresses of each of the nodes. Rather, in this embodiment, the master node 100 transmits a broadcast search message, requesting a response from any nodes within its transmission range. As nodes respond to the broadcast search message, the master node 100 stores their device addresses and selects certain nodes as repeaters as described above. Once selected by the master 100, the various repeater candidates may also send broadcast messages to any nodes within their transmission range.

In one embodiment, once a node has responded to a broadcast search message, the master node 100 (or repeater candidate) instructs the node not to respond to any subsequent broadcast search messages. Alternatively, or in addition, the master node 100 or repeater candidate may simply ignore subsequent responses to broadcast search message responses from nodes which have already responded.

Figure 4:
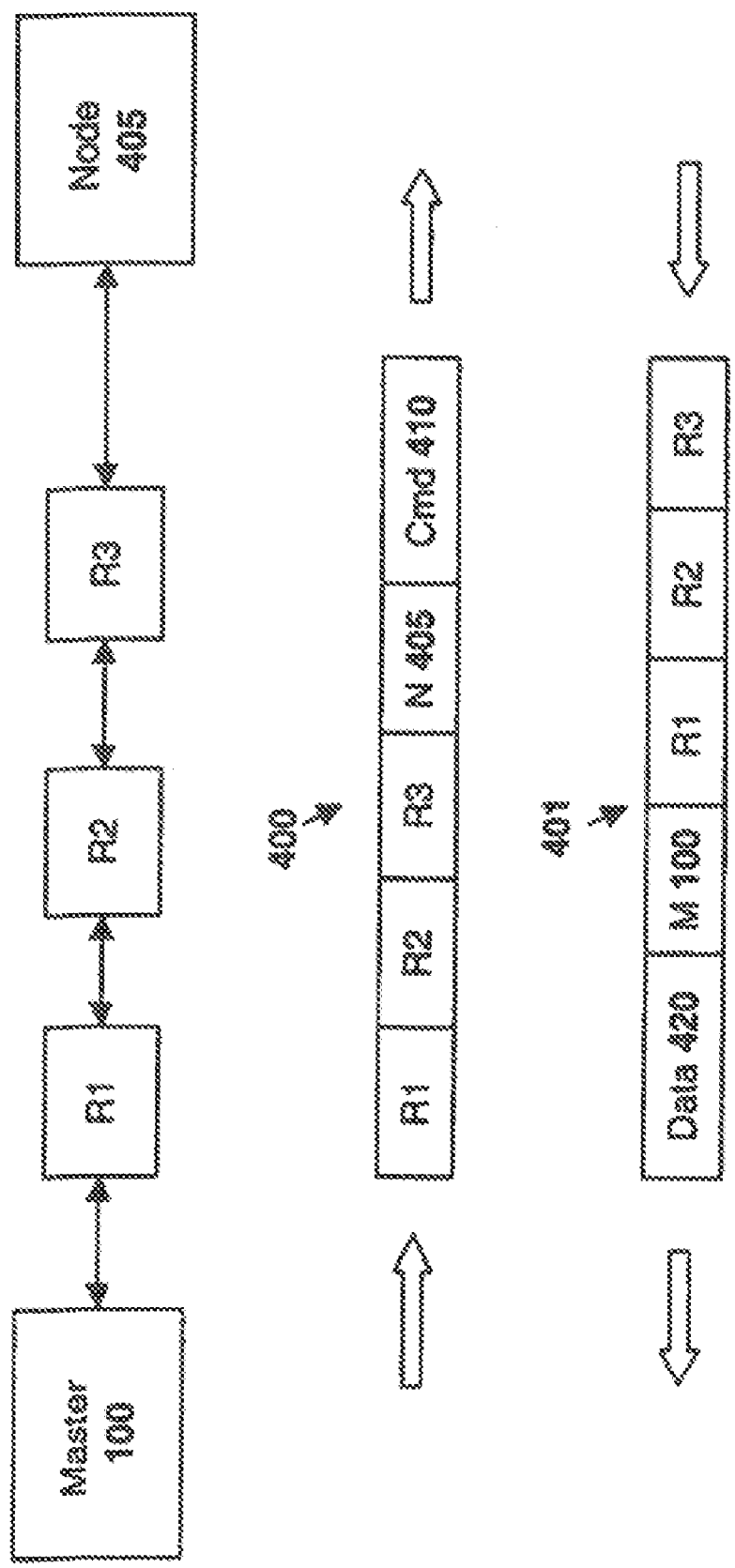
FIG. 4 illustrates packet addressing according to one embodiment of the invention.

In one embodiment, an address of each intermediate node through which a data packet will pass is included in an address field in the data packet. For example, as illustrated in FIG. 4, when the master 100 transmits a data packet 400 containing a particular command 410 (e.g., a proxy return signal strength command), it includes the addresses of each of the nodes, R1-R3, through which the packet will pass on its way to the destination node 405.

Similarly, in one embodiment, when the destination node 405 transmits data 420 (e.g., return signal strength or proxy return signal strength data) in response to the master's command 405, it includes an address of each intermediate node, R3-R1, through which the data packet will pass on its way to the master 100.

It should be noted, however, that various other routing techniques may be implemented while still complying with the underlying principles of the invention. For example, in one embodiment, each node may store a routing table in memory for routing data packets across the network. In this embodiment, only the destination node address (and not the intermediate addresses) is incorporated in the data packet. Each node that receives the data packet in this embodiment checks its routing table to determine the next node to which the packet should be routed (i.e., what the next intermediate node is).

Embodiments of the system and method described herein may be configured to operate differently depending on the overall size of the network. For example, if the network is small enough so that probing all or most of the nodes does not require an unreasonable amount of time, then the best candidates for repeaters can be identified quickly by using the method set forth in FIGS. 2a-b.

However, if the network is large (e.g., above some threshold number of nodes) so that probing most or all the nodes in a reasonable amount of time is not possible, then one embodiment of the system and method can be used to quickly identify repeating nodes so that communications can be established with all nodes. The time/resource advantage of this embodiment is realized because fewer of the communicating nodes need to be probed to identify repeaters for the remaining nodes. In a large network, after communication is established with all nodes, additional available resources can be used to identify better repeater or alternate repeater candidates.

In one embodiment of the system, repeaters do not separate the physical medium over which they communicate into separate "channels." Rather, in this particular embodiment, repeaters re-transmit data on the same channel on which they receive the data (hereinafter "disconnected channel"). However, it should be noted that the underlying principles of the invention are not limited to any particular type of communication channel.

Proxy Architecture

Figure 5A:
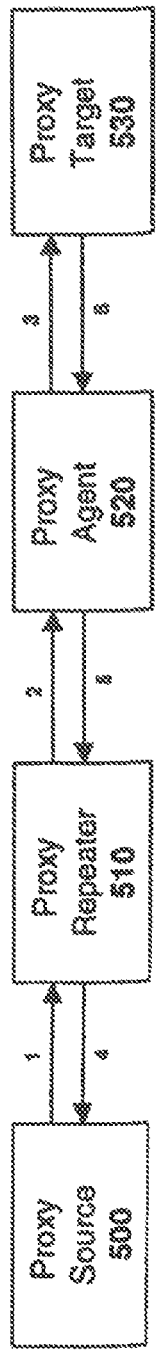
FIG. 5a illustrates communication between a proxy source, a proxy repeater, a proxy agent and a proxy target according to one embodiment of the invention.
Figure 5B:
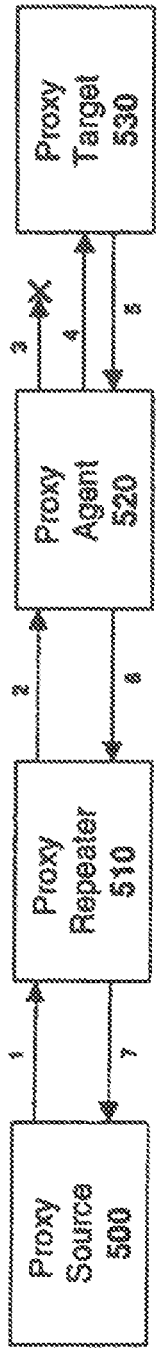
FIG. 5b illustrates a transaction control between a proxy agent and a proxy target according to one embodiment of the invention.
Figure 5C:
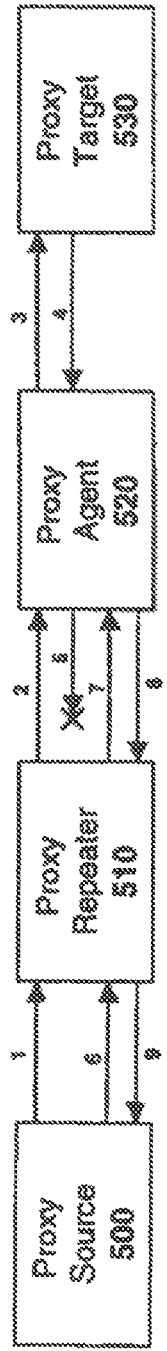
FIG. 5c illustrates transaction control between a proxy repeater and a proxy agent according to one embodiment of the invention.

As illustrated in FIGS. 5a through 5c, in one embodiment, nodes may be configured as proxy sources 500, proxy repeaters 510, proxy agents 520, and/or proxy targets 530. Generally speaking, a proxy source 500 communicates with a proxy target 520 through a proxy repeater 510 and/or a proxy agent 520. In one embodiment, node designations occur automatically, after the nodes have been physically connected to the network (e.g., as described above with respect to repeater selection).

A proxy source 500 is any node originating a proxy transaction. In one embodiment, the proxy source 500 generates a proxy operation by attaching a proxy header to a standard (i.e., non-proxy) data/command packet. One example of a standard data/command packet is a command requesting the value of a particular variable at a target node. If the target node is within transmission range of the source node (i.e., if no hops are required through intermediate nodes), then the source node simply transmits the packet directly to the target using the target's network address and waits for the response. If, however, the target node is outside of the source node's transmission range, then in one embodiment, the source attaches a proxy header to the packet, indicating one or more intermediate nodes (e.g., the proxy repeater 510 and the proxy agent 520) through which the data/command packet must pass to arrive at the target node (or in this case the "proxy" target node 530).

Any nodes which are electrically positioned between the proxy source 500 and proxy agent 520 may be configured as proxy repeaters 510. In one embodiment, when a proxy repeater 510 receives a data/command packet directed to the proxy target 530 it relays the message on to the next proxy repeater, or to the proxy agent 520 (if it is the last proxy repeater 510 in the chain).

A proxy agent 520 is any node which communicates directly with the proxy target 530. In one embodiment, the proxy agent 520 transmits a standard data/command packet to the proxy target 530, rather than a proxy packet (i.e., one with a "proxy" header).

Once the command has been received and processed at the proxy target 530, it generates a response packet addressed to the proxy agent 520 containing the data requested by the proxy source 500. The proxy agent 520 forwards the message to the proxy repeater 510 (by attaching the proxy repeater's address to the packet) which, in turn, forwards the message to the proxy source 500.

It should be noted that various packet addressing and routing techniques may be implemented between the various nodes illustrated in FIGS. 5a-c while still complying with the underlying principles of the invention. For example, in one embodiment, a packet transmitted by the proxy source 500 includes an address header with an address of each node through which the packet must pass to arrive at the proxy target 530. Each node in the transmission path receives the packet, strips its own address from the header and forwards the packet on to the next node in the path (identified by the next address in the header). Each node remembers (i.e., stores in memory) the address of the node from which it received the packet.

After processing the packet (e.g., executing the command and collecting any requested data) the proxy target 530 transmits a response packet back to the proxy agent 520. In one embodiment, the response packet includes only the proxy agent's 520's address. The proxy agent 520, which previously stored the address of the proxy repeater 510 in memory, uses this address to forward the packet back to the proxy repeater 510; which, in turn, transmits the packet to the proxy source 500 using the address of the proxy source 500 which the proxy repeater 510 previously stored in memory.

In contrast to the foregoing addressing/routing scheme, in one embodiment, addresses are not stripped from data packets as they pass from one node to the next. Rather, in this embodiment, a packet is transmitted from the proxy source 500 through to the proxy target 530 with an address of each node in the transmission path embedded in the packet's header. In one embodiment, the packet's header also includes a counter/pointer value which points to the next address in the transmission path. Each node that receives the packet increments (or decrements, depending on the particular algorithm) the counter/pointer value so that it points the next address in the packet's header. In one embodiment, when the proxy target 530 receives the packet, it resets the counter and transmits a response packet containing each node address (e.g., in reverse order).

It should be noted that various other addressing and/or routing techniques may be implemented while still complying with the underlying principles of the invention.

Transaction Control

Various transaction control mechanisms may be employed to provide reliable message transmission between network nodes. For example, a node may retransmit a data/command packet if it does not receive a response for a predetermined period of time. Thus, as illustrated in FIG. 5b, if a message (3) between the proxy agent 520 and proxy target 530 is blocked (e.g., due to interference on the network), the proxy agent 520 will retransmit the message (4) if it does not receive a response from the proxy target 530 after a predefined period of time. As described below, in one embodiment, the retry timing (i.e., the timing for retransmitting a lost message) employed at each of the nodes is highly configurable and can be programmed based on a variety of network variables (e.g., the number of hops between the node and the proxy source 500 and/or proxy target 530).

Different timing variables may be used for the retransmission of proxy messages than those used for standard (i.e., non-proxy) messages. For example, in FIG. 5b, the proxy agent 520 may use conventional timer and retry values to communicate with the proxy target 530 (e.g., 3 retries spaced at 192 milliseconds), whereas the proxy repeater 510 may use different proxy timer and retry values to communicate with the proxy agent 520 and/or the proxy source 500 (e.g., 6 retries spaced at 968 milliseconds).

In one embodiment, the transaction control values to be used for retransmitting a particular message are specified by the proxy source 500 in the data/control packet message header (e.g., the proxy portion of the header).

In one embodiment, the set of control values used at the proxy source 500 and/or proxy repeater 510 specify an increased number of retries relative to the number of retries specified for the proxy agent 520. For example, the number of retries may be configured to increase with increasing distance from the proxy agent 520.

In one particular embodiment, the proxy source 500 provides the proxy repeaters with the number of retries for the last repeater to use. Each repeater prior to the last simply uses one more retry than the next. This value may be computed by adding the remaining repeater count to the retry count.

As described above, each of the network nodes may be configured with different retry timer values. In one embodiment, however, the same retry timer value is used for each of the proxy repeaters 510. The timer value used in this embodiment may be set to be longer than the entire transaction time of the agent/target transaction plus the round trip back to the source. For example, if the agent/target transaction used 3 retries spaced at 192 milliseconds and there is one repeater, then the proxy source/repeater may be programmed to wait approximately 1 second before retrying (i.e., 4*192=768 msec to include the initial attempt plus 3 retries; then add 2*100=200 msec for 1 proxy repeater at 100 msec per hop with 2 hops total, for a total sum of 200+768=968 msec).

Various data service levels may be defined to operate within the system described herein. These include, but are not limited to, an unacknowledged message service ("unackd") where messages transmitted from a source node to a target node do not require a response from the target; an unacknowledged repeat message service ("unackd-rpt") which is an unacknowledged message transmitted a specified number of times; an acknowledged message ("ackd") wherein the source waits for a simple acknowledgement (or confirmation) transmitted from the target node after receipt of the message; and a request/response message ("request/response") wherein the source waits for a response containing data related to the actual processing of the request in the target node. It should be noted, however, that various additional message service types may be employed while still complying with the underlying principles of the invention.

Note that when a response is lost on a disconnected channel, message collisions are avoided by virtue of the fact that all the nodes' retry timers are out of sync by the packet propagation delay time between them.

FIG. 5b illustrates an exemplary message sequence when a transmission error occurs between the proxy agent 520 and the proxy target 530. More particularly, message 3 is lost on its way from the proxy agent 520 to the proxy target 530. The proxy agent 520, after not receiving a response from the proxy target 530 for a predefined retry time period, retransmits the message (message 4) and receives a response (message 5). The proxy repeater 510 in this embodiment does not retransmit message 2 while waiting for message 6 because its retry timer is set to a longer period than the proxy agent's 520's.

FIG. 5c illustrates an exemplary message sequence in when an intermediate response (message 5) transmitted from the proxy agent 520 to the proxy repeater 510 is lost. The proxy repeater 510 transmits message 2 (e.g., a request/response message) to the proxy agent 520 and, after waiting for a response for the retry time period, retransmits the message (illustrated as message 7). The proxy agent 520 then retransmits the response message (message 8) to the proxy repeater 510.

As described in greater detail below, nodes may be programmed to store messages and message responses in memory. Thus, in FIG. 5c, when the proxy repeater 510 retransmits its message (message 7), the proxy agent 520 can immediately retransmit the response (message 8) which it previously stored in memory.

It should be noted that, in the foregoing example, message 6 is superfluous, but harmless (i.e., the proxy repeater 510 may be configured to ignore it). In one embodiment, the proxy source's 500's retry timer may be set long enough to prevent this re-transmission. However, exponentially increasing retry timers in this manner may become problematic in certain situations (e.g., with a large number of repeaters).

Response Flow

For request/response transactions carried out under one embodiment, although the response packet relayed upstream will be identical to that originally sent by the proxy target 530, the source address of the response received by the proxy source 500 from the first repeater 510 will be that of the repeater, not the proxy target 530.

In one embodiment, each proxy repeater/agent buffers any responses it receives. This way, if a response is lost in transmission (e.g., message 5 of FIG. 5c), and a request retry is received, it will not be necessary to re-fetch the response from the downstream path.

Figure 6:
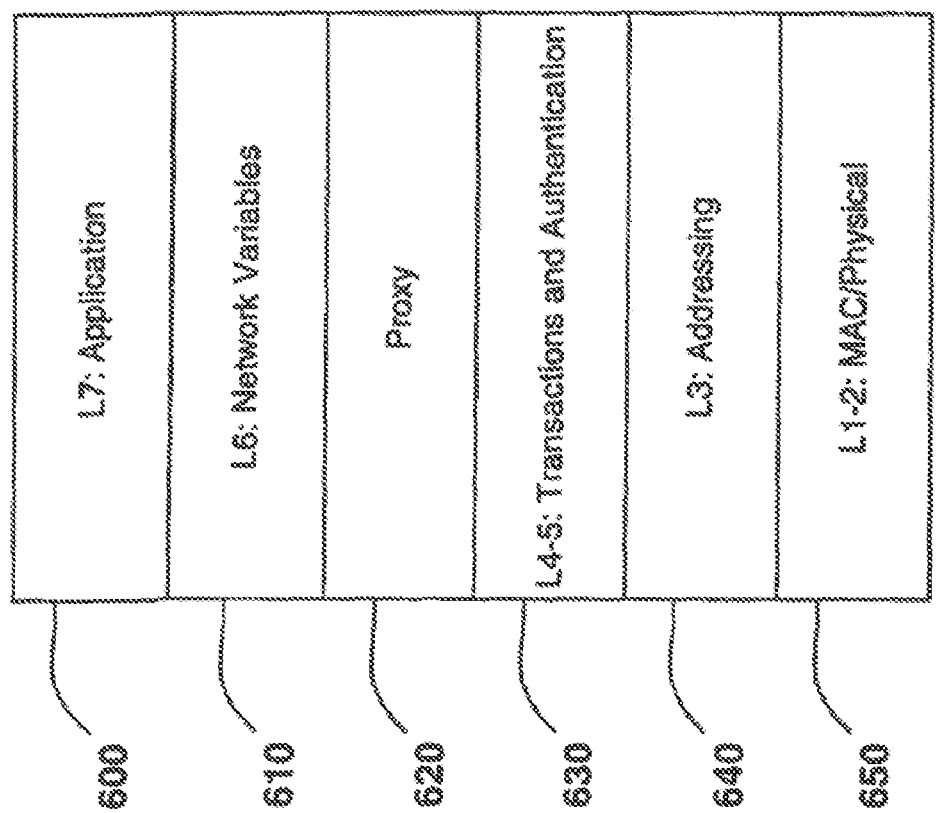
FIG. 6 illustrates one embodiment of a proxy protocol configured between a transaction/authentication layer (layers 4-5) and a plurality of network variables (layer 6).

In one embodiment, this buffering feature is accomplished at a proxy layer configured in the network protocol stack. As illustrated in FIG. 6, in one embodiment, the proxy layer 620 resides between a transaction/authentication layer 630 and a network variables layer 610. As indicated, these layers roughly correspond to the transport/session layers (L4-5) and the presentation layer (L6) of the Open System Interconnection ("OSI") model.

In one embodiment, an agent/target transaction may be a different type of transaction from the corresponding repeater/agent transaction. For example, the repeater/agent transaction may be a request/response message whereas the agent/target transaction may be a acknowledged message multicast to a group of nodes. In this embodiment, the response transmitted from the agent to the repeater may be a simple one-byte completion code conveying success or failure of the underlying transaction. For example, the agent could send an acknowledged multicast to a group and upon receiving all the acknowledgements, send a "success" response upstream. Similarly, if the agent/target transaction is request/response and no response is received, a "failure" response may be sent upstream along with the repeater index of the node detecting the failure.

Priority

In an embodiment in which contention-based channels are used, message priorities may be defined. For example, a proxy source 500 may define a priority level (e.g., priority=1, 2, 3, ... etc) for each message it generates. In one embodiment, priority may be strictly inherited. For example, if a proxy source 500 defines a priority, then priority is used by all proxy repeaters 510 and the proxy agent 520.

Authentication

Various authentication techniques may be implemented to provide for secure message transmission across the network.

In one embodiment, authentication, like priority, may be inherited. In this embodiment, each hop may be authenticated separately. For example, the first proxy repeater may challenge the proxy source and receive a successful reply before relaying the proxied message on to the next proxy repeater or proxy agent.

In one embodiment, in order to support changing of authentication keys, an authentication key may be embedded in a proxy message header for the proxy agent 520 to use when communicating with the proxy target 530. This configuration handles the case where the agent and target have different authentication keys (presumably only temporarily). In one embodiment, the proxy source 500 ensures that authentication keys are the same in the intermediate points of the proxy chain (e.g., the proxy repeaters 510) before using authentication. The proxy agent 520 of one embodiment is capable of using the authentication key only for that outgoing transaction rather than changing its own key.

The authentication key passed down for such messages may be in the form of a key increment. In other words, the proxy agent 520 will use its own key and add the key increment to it to derive the proxy target's 530's key. This feature will provide secure authentication without the need for transmitting the authentication key over a non-secure channel.

Multicast

In one embodiment, unacknowledged broadcast and group messages are handled in a special way. In this case, each proxy repeater may serve as both a proxy agent and a proxy repeater. When a proxy repeater identifies an unacknowledged broadcast or group message as the message to be delivered by the proxy agent (by peeking ahead to the end of the proxy header), it first sends the message as if it were a proxy agent and then relays the message on to the next proxy repeater or proxy agent.

Note that any given node may receive such a multicast more than one time. Therefore, in one embodiment, it is necessary that such multicasts be idempotent.

Addressing

In one embodiment, a single domain scheme is used. Thus, the proxy repeaters 510 and proxy agent 520 of this embodiment may use the same domain ID as the proxy source 500. Accordingly, proxy repeaters 510 and proxy agents 520 may be commissioned with a domain ID topologically, closest to the proxy source 500 first.

In one embodiment, the proxy source 500 uses unicast (e.g., subnet/node) addressing to communicate with the first proxy repeater 520 (although other addressing modes may be used as well). The proxy header used in this embodiment may contain only unicast addresses so all repeater-to-repeater and repeater-to-agent downstream messages are unicast.

Alternate Path

Some types of media provide multiple paths over which to transmit. For example, multiple frequency bands might be used for transmission, some more likely to function than others depending on types of interference. In one embodiment, the channel provides two paths, a primary and alternate path, and the path to be used at each hop is encoded on a per-hop basis in the proxy header.

In this embodiment, the repeater selection algorithm may take the presence of these two paths into consideration. When measuring signal strength, separate measurements are conducted on each of the two paths and each path is considered as an independent candidate. Because the two paths may have different transmission characteristics in terms of, for example, transmission time, a separate set of minimum and maximum signal strength threshold values may be maintained for the two different paths.

Routing Tables

The proxy source may be supplied with a routing table containing for each unicast address (subnet/node or node ID), a list of repeaters and the agent to use to reach that address (e.g., perhaps a null set), as well as a first choice path to use at each hop. For multicast addresses, the list may contain the set of agents to which the multicast is to be delivered.

Embodiments of the invention include various steps, which have been described above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Embodiments of the invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purpose of explanation, numerous specific details were set forth in order to provide a thorough understanding of the invention. It will be apparent, however, to one skilled in the art that the invention may be practiced without some of these specific details.

For example, while FIG. 1 illustrates a terrestrial network configuration, various non-terrestrial configurations such as radio frequency broadcast, satellite broadcast, personal communication services ("PCS"), Global System for Mobile Communications ("GSM"), and cellular (including code division multiple access ("CDMA") and time division multiple access ("TDMA")) may be implemented while still complying with the underlying principles of the invention. Moreover, one embodiment of the invention employs a heterogeneous network configuration, including both terrestrial and non-terrestrial components.

Similarly, although the proxy layer is illustrated in FIG. 6 between the transaction/authentication layer 630 and the network variables layer 610, alternate embodiments may incorporate the same proxy functionality at other layers in the OSI model. For example, in one embodiment, the network functions described above are implemented at the network/addressing layer (i.e., OSI layer 3) 640. In this embodiment, transaction control and authentication would be implemented on an end-to-end basis (i.e., between the proxy source 500 and the proxy target 530) rather than on an individual node-to-node basis as described above.

Thus, the scope and spirit of the invention should be judged in terms of the claims which follow.

What is claimed is:

1. A method comprising:

transmitting a data packet to a proxy agent node from a proxy source node, the data packet including a proxy header that indicates the path between the proxy source node and a proxy target node through the proxy agent, wherein the proxy source node and proxy agent node each have a programmable retry timer associated therewith, each retry timer programmed with a retry time period after which each respective node will retransmit the data packet if that node has not received an appropriate response to said data packet;

retransmitting, from the proxy source node, the data packet to the proxy agent node when a period of time for a response packet from the proxy target node to reach the proxy source node has elapsed, wherein the period of time is at least equal to the retry time period of the proxy source node, the retry time period of the proxy agent node, and any other intervening nodes combined.

2. The method of claim 1, further comprising:

transmitting the data packet to the proxy target node from a proxy agent node;

retransmitting, from the proxy agent node, the data packet to the proxy target node when a period of time for a response packet from the proxy target node to reach the proxy agent node has elapsed, wherein the period of time is equal to the retry time period of the proxy agent node.

3. The method of claim 2, further comprising:

intercepting the data packet transmitted from the proxy source node at a proxy repeater node prior to it reaching the proxy agent node;

relaying the data packet from the proxy repeater node to the proxy agent node;

retransmitting, from the proxy repeater node, the data packet to the proxy agent node when a period of time for a response packet from the proxy target node to reach the proxy agent node has elapsed, wherein the period of time is equal to the retry time period of the proxy agent node and the proxy repeater node.

4. The method of claim 3, wherein the retry time of the proxy agent and repeater nodes is the same.

5. The method of claim 3, wherein the proxy header includes the retry timer value for the proxy repeater and proxy agent node.

6. The method of claim 1, wherein the respective retry timer employed at each of the nodes is based on the number of hops between the proxy source node and the proxy target node.

7. The method of claim 1, wherein each node in the transmission patch strips its address from the proxy header prior to transmitting the data packet along the path.

8. The method of claim 1, wherein the proxy header includes the retry timer value for the proxy agent node.

9. A system comprising:

a proxy source node to transmit a data packet to a proxy target node, the data packet including a proxy header that indicates the path between the proxy source node and the proxy target node;

a proxy repeater coupled to the proxy source node in a path between the proxy source node and a proxy agent; the proxy agent node to communicate directly with the proxy target node, wherein the proxy repeater and proxy agent node each having a programmable retry timer associated therewith, each retry timer programmed with a retry time period after which the node will retransmit the data packet if it has not received an appropriate response to said data packet and wherein the programmable retry time value of the proxy repeater and proxy agent node is the same.

10. The system of claim 9, wherein the respective retry timer employed at each of the nodes is based on the number of hops between the proxy source node and the proxy target node.

11. The system of claim 10, wherein the proxy source node and the proxy agent node employ a transaction control scheme wherein the retry timer of the proxy agent node is shorter than the retry timer of the proxy source node.

12. The system of claim 10, wherein each node in the transmission patch strips its address from the proxy header prior to transmitting the data packet along the path.

* * * * *